United States Patent
Wagener

(10) Patent No.: US 9,778,421 B2
(45) Date of Patent: Oct. 3, 2017

(54) LARGE SCALE OPTICAL SWITCH USING ASYMMETRIC 1×2 ELEMENTS

(71) Applicant: NISTICA, INC., Bridgewater, NJ (US)

(72) Inventor: Jefferson L. Wagener, Morristown, NJ (US)

(73) Assignee: Nistica, Inc., Bridgewater, NJ (US)

( * ) Notice: Subject to any disclaimer, the term of this patent is extended or adjusted under 35 U.S.C. 154(b) by 50 days.

(21) Appl. No.: 14/883,051

(22) Filed: Oct. 14, 2015

(65) Prior Publication Data

US 2017/0108651 A1    Apr. 20, 2017

(51) Int. Cl.
G02B 6/35        (2006.01)
G02B 6/032       (2006.01)

(52) U.S. Cl.
CPC .......... *G02B 6/3546* (2013.01); *G02B 6/032* (2013.01); *G02B 6/3504* (2013.01); *G02B 6/356* (2013.01); *G02B 6/359* (2013.01); *G02B 6/3556* (2013.01); *G02B 6/3584* (2013.01); *G02B 6/3592* (2013.01); *G02B 6/3596* (2013.01)

(58) Field of Classification Search
CPC .... G02B 6/351; G02B 6/3536; G02B 6/3532; G02B 6/3534; G02B 6/3502–6/3508; G02B 6/3544; G02B 6/3546; G02B 6/356
See application file for complete search history.

(56) References Cited

U.S. PATENT DOCUMENTS

| | | |
|---|---|---|
| 6,118,911 A | 9/2000 | Bennett et al. |
| 6,430,328 B1 | 8/2002 | Culver et al. |
| 6,721,473 B1 | 4/2004 | Islam |
| 6,847,479 B1 | 1/2005 | Islam |
| 6,882,771 B1 | 4/2005 | Islam |
| 6,891,989 B2 | 5/2005 | Zhang et al. |
| 6,915,032 B1 | 7/2005 | White et al. |
| 6,956,687 B2 | 10/2005 | Moon et al. |
| 7,092,599 B2 | 8/2006 | Frisken |
| 7,116,862 B1 | 10/2006 | Islam |
| 7,123,833 B2 | 10/2006 | Szczepanek et al. |
| 7,126,740 B2 | 10/2006 | Szczepanek et al. |
| 7,339,714 B1 | 3/2008 | Islam |
| 7,397,980 B2 | 7/2008 | Frisken |
| 2003/0016425 A1 | 1/2003 | Tan et al. |
| 2003/0128918 A1* | 7/2003 | Zhang ............... G02B 6/12007 385/24 |
| 2010/0202724 A1 | 8/2010 | Little et al. |

* cited by examiner

*Primary Examiner* — Jerry Rahll
(74) *Attorney, Agent, or Firm* — Mayer & Williams, PC; Stuart H. Mayer

(57) ABSTRACT

An optical switching arrangement includes a plurality of input and output waveguides. Each of the input waveguides has a first plurality of 1×2 optical switches associated therewith and extending therealong. Each of the output waveguides has a second plurality of 1×2 optical switches associated therewith and extending therealong. Each of the first and second plurality of optical switches is selectively switchable between a through-state and a cross-state. The input and output waveguides are arranged such that optical losses arising for any wavelength of light only depend on a length of segments of the input and output waveguides located between adjacent ones of the 1×2 optical switches. Each of the first plurality of optical switches associated with each of the input waveguides is optically coupled to one of the second plurality of optical switches in a different one of the output waveguides when both optical switches are in the cross-state.

50 Claims, 4 Drawing Sheets

LARGE SCALE OPTICAL SWITCH USING ASYMMETRIC 1×2 ELEMENTS

BACKGROUND

There is a need in the industry for large port count optical switches. These switches are typically designed to be single mode with broad optical bandwidth and a multitude of input and output fibers. Multiple practical techniques exist for making smaller port count switches (e.g., 2×2, 4×4, 8×8, 16×16) but most of these techniques do not scale well at or above 32×32. Specifically, performance parameters of interest start become more difficult to achieve, including but not limited to loss, crosstalk and switching speed. Switches are needed that have 128×128 ports or higher with low loss and switching speeds significantly faster than current generation switches.

Most high port count (e.g., greater than 128) switches use a 3D MEMs architecture, where a 2 axis tilt mirror is used to steer a free space beam from one input port to a second mirror that then steers the beam to a second output port. Due to the inherent modal propagation in free space, these switches are difficult to scale without sacrificing switching time. This is fundamentally due to the larger beam requirements and therefore larger mirrors as the port count grows.

SUMMARY

In accordance with one aspect of the subject matter described herein, an optical switching arrangement includes a plurality of input waveguides and a plurality of output waveguides. Each of the input waveguides has a first plurality of 1×2 optical switches associated therewith and extending therealong. Each of the output waveguides has a second plurality of 1×2 optical switches associated therewith and extending therealong. Each of the optical switches in the first and second plurality of optical switches are selectively switchable between first and second states such that in a first state each optical switch allows light propagating in the input or output waveguide with which it is associated to continue propagating therethrough undisturbed without encountering any intervening mode perturbing structures between adjacent ones of the 1×2 switches and in a second state each optical switch couples light into or out of the input or output waveguide with which it is associated. Each of the first plurality of optical switches associated with each of the input waveguides is optically coupled to one of the second plurality of optical switches in a different one of the output waveguides when both optical switches are in the second state.

In one particular implementation, each of the 1×2 switches includes a displaceable optical cross-guide. The 1×2 switch is in the first state when the optical cross-guide is a first distance from the input or output waveguide with which each of the 1×2 switches is respectively associated and in a second state when the optical cross-guide is a second distance from the input or output waveguide with which each of the 1×2 switches is respectively associated. An actuator selectively displaces the displaceable optical cross-guide so that its distance from the input or output waveguide with which it is associated is equal to the first or second distance.

DETAILED DESCRIPTION

As detailed below, an M×M optical switch is provided which includes an array of input optical waveguides and an array of output optical waveguides that may each be located on a separate platform. A series of asymmetric 1×2 optical switches are integrated with each input waveguide. Each asymmetric 1×2 switch associated with any given waveguide is able to switch light propagating in that waveguide to a different one of the output waveguides. In this way an optical input signal received by an input waveguide can be selectively directed to any output waveguide.

Figure 1A:
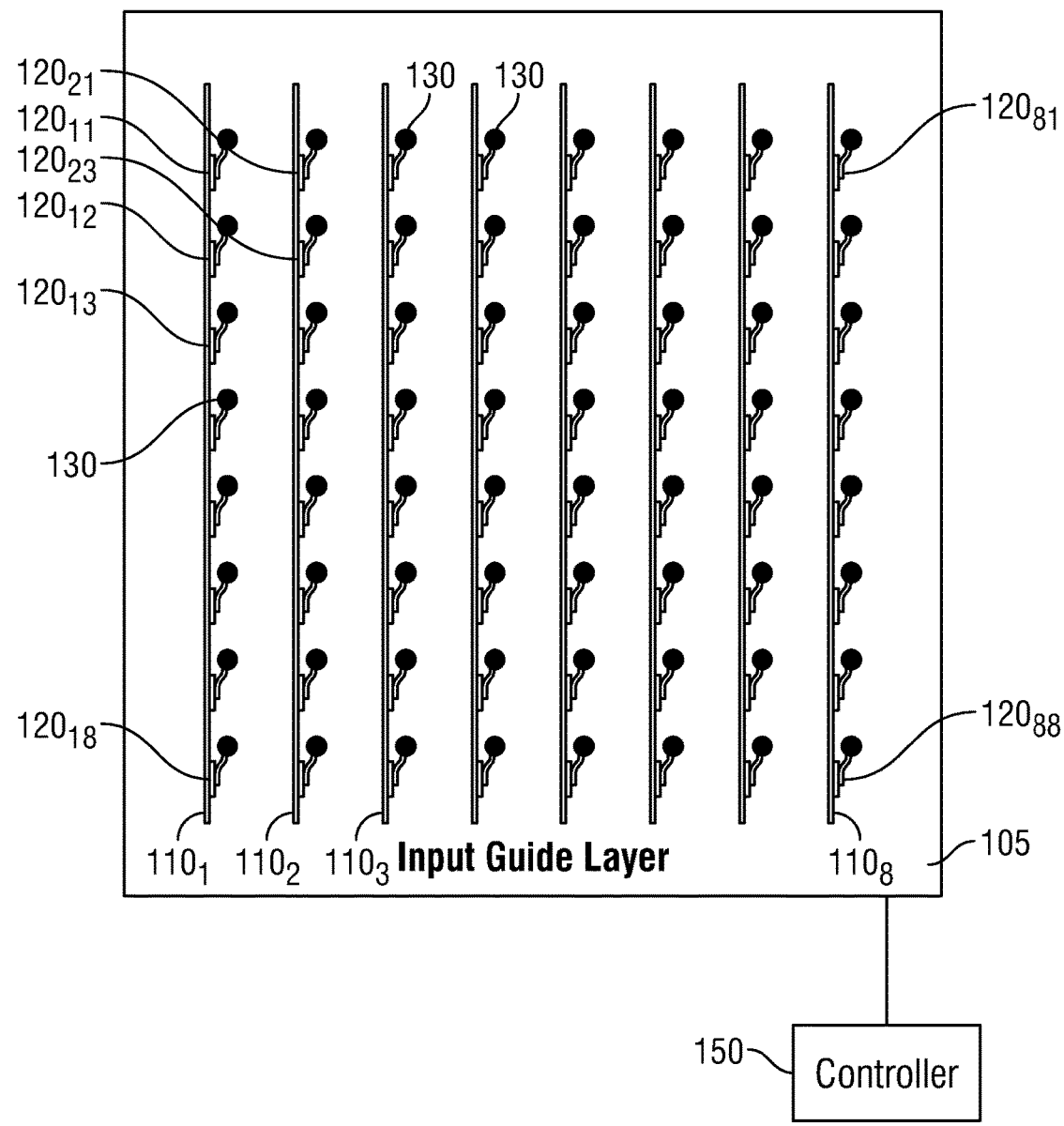
FIG. 1A shows an input platform for an M×M optical switch and FIG. 1B shows an output platform for an M×M optical switch.

FIG. 1A shows an input platform for an M×M optical switch. The input platform includes an array of input optical waveguides $110_1$, $110_2$, $110_3$ ... $110_8$ (collectively "110") that may be formed on a common substrate 105. As shown, in some embodiments the waveguides 110 may be parallel to one another, although this need not be the case in all embodiments. Although 8 input optical waveguides 110 are shown in this example, any number of input optical waveguides may be employed, with each input waveguide corresponding to one input port of an optical switch. Accordingly, for a large scale optical switch having, for instance, 128 input and output ports, there will be 128 input optical waveguides 110. Thus, more generally, for an M×M optical switch there will be M input optical waveguides 110.

A series of 1×2 asymmetric optical switches 120 are located along each of the waveguides 110. Specifically, for an M×M optical switch, there will be M 1×2 asymmetric switches 120 located along each waveguide 110. As shown in FIG. 1A for an 8×8 optical switch, 1×2 switches $120_{11}$, $120_{12}$, $120_{13}$ ... $120_{18}$ are located along waveguide $110_1$, 1×2 switches $120_{21}$, $120_{22}$, $120_{23}$ ... $120_{28}$ are located along waveguide $110_2$, and so on. As explained below, the 1×2 asymmetric switches 120 are asymmetric in the sense that they exhibit low loss when in a first state and may exhibit significantly higher loss when in a second state. A vertical coupler 130 is associated with each 1×2 asymmetric switch 120. As also explained below, when a 1×2 switch is in its open or on state, light received by the 1×2 switch will be directed to the vertical coupler 130 with which it is associated. The vertical coupler 130 will, in turn, pass the light to another 1×2 switch located on an output waveguide platform, which is discussed below.

Each 1×2 switch 120 can direct light propagating in the input waveguide 110 with which it is associated in one of two directions based on the state of the asymmetric switch 120. In a first state, referred to as the through-state, the 1×2 switch causes the light to continue propagating in the input waveguide 110. That is, the light continues along the thru-path largely unperturbed. In a second state, referred to as a cross state, the 1×2 switch 120 couples the light out of the input waveguide 110 and directs it to the vertical coupler 130 associated with that asymmetric 1×2 switch 120.

The 1×2 asymmetric switches 120 are designed to have very low loss in the first or through-state Accordingly, if all the asymmetric 1×2 switches associated with a given input waveguide 110 are in the through-state, then the light propagating in that waveguide will pass through that waveguide largely unperturbed. For example, in some embodiments, the 1×2 asymmetric switches 120 may have a loss in the through-state of about 0.0001 db. As explained below, a much greater amount of loss may be tolerated when the 1×2 switch is in the second or cross state.

Figure 1B:
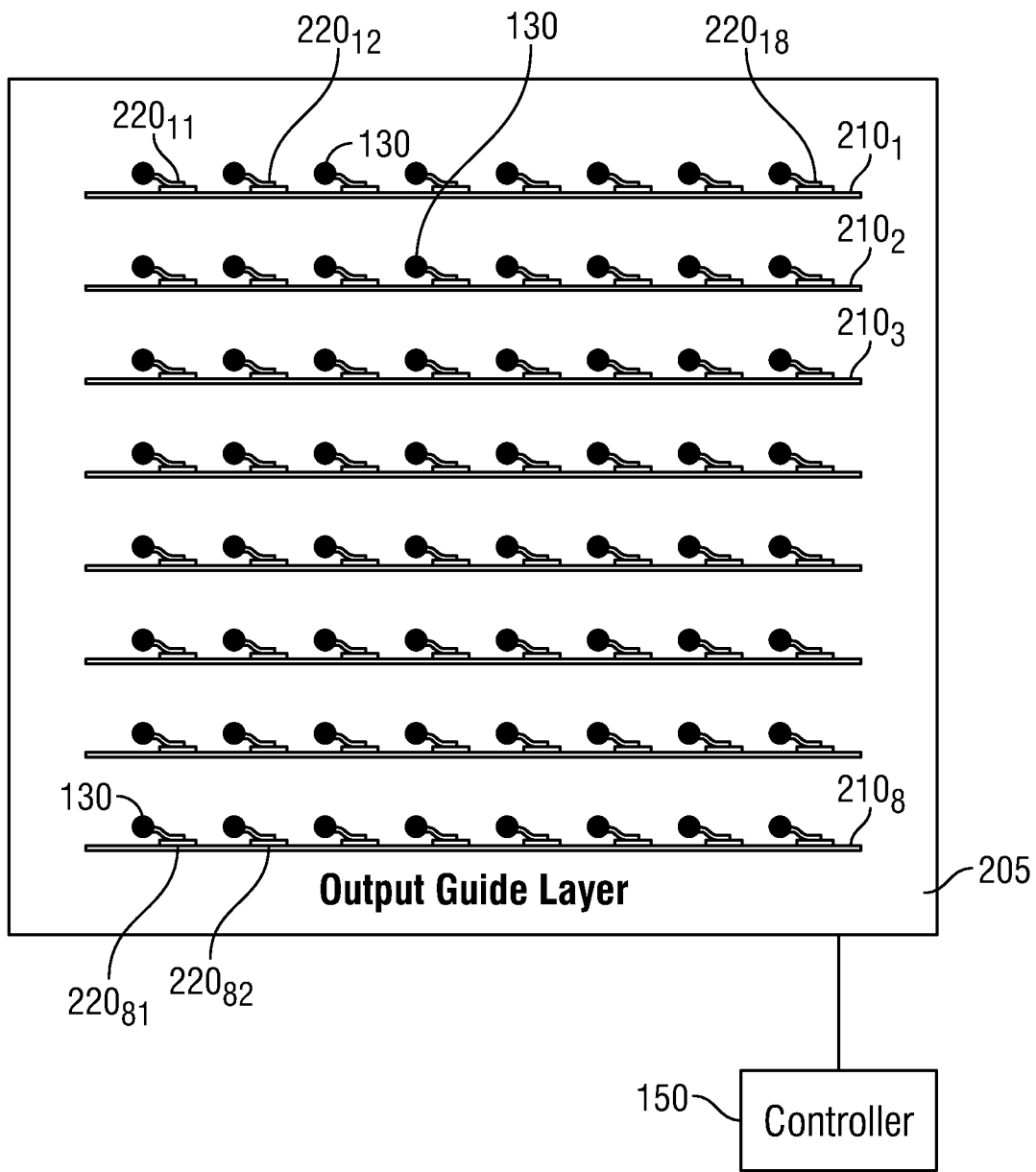

FIG. 1B shows an output platform for the aforementioned 8×8 optical switch. The output platform includes an array of output optical waveguides $210_1$, $210_2$, $210_3$ ... $210_8$ (collectively "210") that may be formed on a common substrate 205. In general, the array of output optical waveguides 210 is largely the same as the array of input optical waveguides 110, with the same number of waveguides and the same number of 1×2 asymmetric optical switches. That is, similar to the input waveguide platform in FIG. 1A, the output waveguide platform of FIG. 1B includes a series of 1×2 asymmetric optical switches 220 that are located along each of the waveguides 110. Specifically, for an M×M optical switch, there will be M 1×2 asymmetric switches 220 located along each waveguide 210. As shown in FIG. 1B, 1×2 switches $220_{11}$, $220_{12}$, $220_{13}$ ... $220_{18}$ are located along waveguide $210_1$, 1×2 switches $220_{21}$, $220_{22}$, $220_{23}$ ... $220_{28}$ are located along waveguide $210_2$, and so on. The asymmetric optical switches 220 are similar to the asymmetric optical switches 110 described above. One of the vertical couplers 130 associated with each 1×2 asymmetric switch 120 is also associated with one of the 1×2 asymmetric switches 220.

In one embodiment, input and output waveguide platforms are stacked or overlaid on top of one another so that corresponding asymmetric 1×2 switches 120 and 220 (i.e., pairs of switches 120 and 220 that are optically coupled to one another vis a common vertical coupler 130) are aligned with one another. That is, input and output waveguide platforms are located in different planes with asymmetric 1×2 switch $120_{ij}$ being located above (or below) asymmetric switch $220_{ji}$. Thus, for example, asymmetric 1×2 switch $120_{12}$ is located above (or below) asymmetric 1×2 switch $220_{21}$ and are optically coupled to one another by vertical coupler $130_{12}$. As another example, asymmetric 1×2 switch $120_{32}$ is located above (or below) asymmetric 1×2 switch $220_{23}$ and are optically coupled to one another by vertical coupler $130_{32}$. For simplicity of manufacturing, each 1×2 switch in pairs of corresponding switches 120 and 220 may be located directly above or below one another, although this need not necessarily be the case.

As shown in FIGS. 1A and 1B, each of the 1×2 optical switches is selectively addressable by a controller 150 for placing the switches in the through-state or the cross-state. In operation, an optical signal propagating through one of the input waveguides 110 can be selectively switched to one of the output waveguides by placing both corresponding asymmetric 1×2 switches $120_{ij}$ and $220_{ji}$ in the cross-state. Thus, for example, by placing both asymmetric 1×2 switch $120_{12}$ and asymmetric 1×2 switch $220_{21}$ in the cross-state, an optical signal can be switched from input waveguide $110_1$ to output waveguide $220_2$ via vertical coupler $130_{12}$. As another example, by placing both symmetric 1×2 switch $120_{32}$ and asymmetric 1×2 switch $220_{23}$ in the cross-state, an optical signal can be switched from input waveguide $110_3$ to output waveguide $220_2$ via vertical coupler $130_{23}$. Thus, in this way, by placing both asymmetric 1×2 switches in the appropriately chosen pair of corresponding asymmetric 1×2 switches in the cross-state an optical signal can be switched from any input waveguide 110 to any output waveguide 220.

It should be noted that the arrangement of input and output waveguides shown in FIGS. 1A and 1B is by way of example only. More generally, the input and output waveguides may be arranged in any manner that allows corresponding pairs of 1×2 switches placed in the cross-state to couple an optical signal from any input waveguide 110 to any output waveguide 220 while the optical signal only traverses other 1×2 switches in the through-state.

As illustrated above, an optical signal can be switched from any input waveguide 110 to any output waveguide 220 by placing only a single asymmetric 1×2 switch in each waveguide in the cross-state. At the same time all the other asymmetric 1×2 switches in each waveguide are in the through-state. Thus, an optical signal will generally traverse multiple asymmetric 1×2 switches in the through-state and only a single pair of asymmetric 1×2 switches in the cross-state. As a consequence, it is important that the asymmetric 1×2 switch exhibit low loss in the through-state. On the other hand, since the optical signal only traverses a single pair of asymmetric 1×2 switches in the cross-state, a significantly greater amount of loss can be tolerated when the asymmetric 1×2 switches are in the cross-state.

The asymmetric 1×2 switches 130 employed in optical switch 100 may be based on any suitable technology. For instance, in one embodiment, a mechanically-actuated type switch switch may be employed, one example of which will be described with reference to FIGS. 3 and 4. This particular example will be illustrated using a micro-electromechanical (MEMs) device as the actuator.

Figure 2:
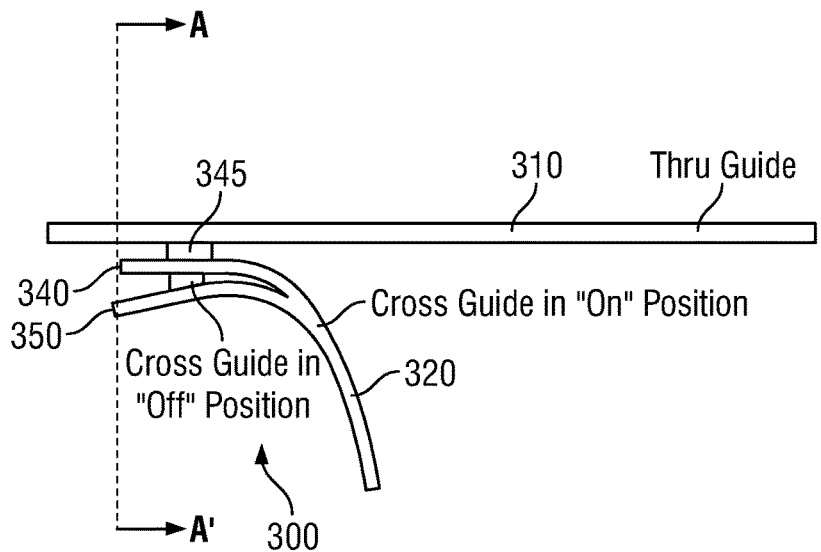
FIG. 2 shows a plan view of a single input or output waveguide of the type shown on the input and output platforms shown in FIGS. 1A and 1B.

FIG. 2 shows a plan view of a single input or output waveguide 310 of the type shown in FIGS. 1A and 1B as waveguides 110 and 210, respectively. The waveguide 310 serves as the stationary through-guide portion of the asymmetric 1×2 switch 300. A second waveguide 320 serves as the actuatable cross-guide of the asymmetric 1×2 switch 300, which is movable between a first or "on" position 340 and a second or "off" position 350. When the cross-guide 320 is in the on-position 340 it is sufficiently close to the through guide 310 to couple light from the through guide to the cross-guide 320. Likewise, when the cross-guide 320 is in the off-position 350 it is sufficiently remote from the through guide 310 to cause no measureable mode perturbation in the through guide 310. As a consequence light is not coupled to any substantial degree between the cross-guide 320 and the through guide 310 while in the off-position 350. That is, when the cross-guide 310 is in the on-position 340 the asymmetric 1×2 switch 300 is in the cross-state and when the cross-guide 310 is in the off-position 350 the asymmetric 1×2 switch 300 is in the through-state.

One or more stoppers 345 may be placed between the through-guide 310 and the cross-guide 320 so that the cross-guide 320 lands on the stopper 345 when transitioning to the on position 340. In this way a consistent gap may be maintained between the through-guide 310 and the cross-guide 320 when the cross-guide 320 is in the on position 340. In one embodiment the stopper 345 is secured to the cross-guide 320.

Figure 3A:
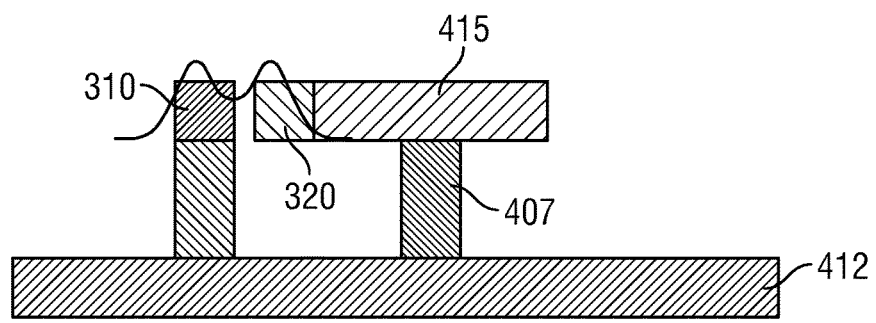
FIGS. 3A and 3B are cross-sectional views of an asymmetric 1×2 switch.
Figure 3B:
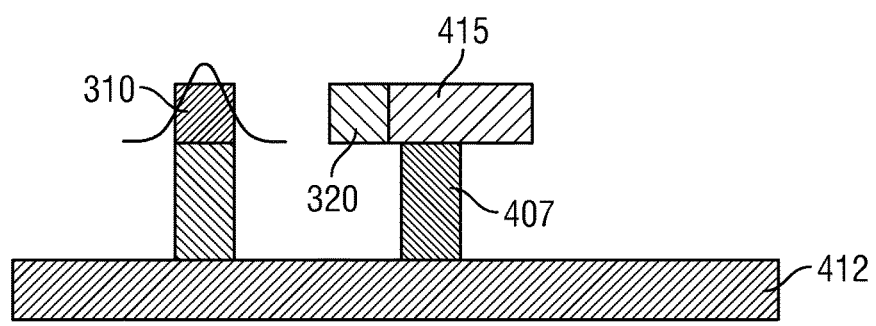

FIGS. 3A and 3B are cross-sectional views of the asymmetric 1×2 switch 300 of FIG. 3 taken along line A-A'. As shown, though-guide 310 extends on a support 405, which in turn is located on a platform 412 (e.g., substrates 105 or 205 in FIG. 1A or 1B). The visible, proximate end of cross-guide 320 is suspended in space while the distal end of the cross-guide 320 is secured to a second support (not shown) that is located on the platform 412. A laterally displaceable actuator 415 is located on a support 407, which in turn is located on the platform 412. Laterally displaceable actuator 415 is adjacent to the proximate end of the cross-guide 320 and is movable in a first direction (the left direction in FIGS. 3A and 3B) so that it exerts a lateral force on the cross-guide 320, which undergoes a displacement to the on position 340, as shown in FIG. 3A. When the laterally displaceable actuator 415 is retracted, the cross-guide 320 returns to the position shown in FIG. 3B, which corresponds to the off-position 350 of the cross-guide 320.

As previously mentioned, in one embodiment the laterally displaceable actuator 415 is a MEMs-based actuator. In one particular embodiment the MEMs-based actuator may be a digital two-state device, with one state corresponding to the on-position 340 of the cross-guide 320 and the other state corresponding to the off-position 350 of the cross-guide 320. The MEMs-based actuator 415 may also be latching, with the off-position of FIG. 3(b) being the latched state in which the actuator 415 is normally maintained. In this way a failure in one of the asymmetric 1×2 switches will not cause a complete failure of the entire M×M optical switch 300. Rather, the M×M optical switch 300 will simply lose the capability of switching between one particular input and output waveguide but would otherwise remain operational. Of course, in other embodiments the actuator 415 may be latched so that the cross-guide 210 is in the on-position or, alternatively, the actuator 415 may be unlatched.

When in the off-position, the distance between the cross-guide 320 and through-guide 310 should be sufficiently great so that no measurable optical mode perturbations are caused in the through-guide 310. Thus, the distance traveled in the lateral direction by the actuator 415 when transitioning from the off-position 350 to the on-position 340 generally should be large compared to the mode field radius (e.g., several mode field diameters). By way of example, in one embodiment, for a waveguide having a 1 micron core with a mode radius of about 1 microns, the distance traveled in the lateral direction by the actuator 415 when transitioning from the off-position to the on-position may be about 3-5 microns. Likewise, in some embodiments the overall dimensions of the individual 1×2 switches are on the order of about 50 microns or less.

Of course, instead of being a MEMs-based switch, the 1×2 optical switches may employ other technologies. For instance, in one embodiment the 1×2 optical switches may be acousto-optical switches.

The vertical couplers 130 shown in FIGS. 1A and 1B may be any suitable type of vertical coupler such as a vertical adiabatic coupler for out-of-plane optical coupling between different waveguides. In one particular example, the vertical couplers 130 may be grating-based vertical couplers in which a grating is etched into a waveguide. The grating at least partially diffracts light traveling in the waveguide so that the light is coupled out of the plane of the waveguide at some angle of diffraction and coupled into another waveguide.

In some embodiments of the invention the input and output platforms of the optical switch may be formed from one or more Planar Lightwave Circuits (PLCs). PLCs are optical systems comprising one or more single or multi-mode waveguides that are integrated on the surface of a semiconductor substrate, where the waveguides are typically combined with other optical components (such as the 1×2 switches and the vertical adiabatic couplers described herein, for example) to provide complex optical functionality. More specifically, the waveguides are usually embedded within an optical layer that may consist of buffer layers, cladding layers, core layers and encapsulation layers formed on the planar substrate which is frequently formed from doped/undoped silicon, LiNbO$_3$, InP, GaAs, and/or polymer (including thermo-optic and electro-optic polymers). The substrate may serve as a mechanical support for the otherwise fragile waveguide and it can, if desired, also play the role of the bottom portion of the cladding. In addition, it can serve as a portion of the fixture to which optical fibers are attached so as to optically couple cores of an input/output fibers to the cores of the waveguide.

Fabrication techniques required for manufacturing planar lightwave circuits using silicon are generally well known. For instance, planar lightwave circuits may be fabricated using standard semiconductor manufacturing techniques. Therefore, the fabrication of the planar lightwave circuit can be accomplished using standard monolithic semiconductor manufacturing techniques including chemical vapor phase deposition techniques, physical vapor deposition or sputtering techniques, evaporation techniques, spin-on deposition techniques, photolithography, wet or dry etching techniques, etc. The specific fabrication technique is often chosen with respect to manufacturing equipment and materials used in the deposition. As such, the switches disclosed herein may be fabricated in conjunction with many techniques and materials, as will be recognized by one of ordinary skill in the art.

Likewise, in some embodiments of the invention the input and output platforms of the optical switch may be formed from one or more Photonic Integrated Circuits (PICs). PICs are similar to planar lightwave circuits, except that whereas planar lightwave circuits generally only include passive components, photonic integrated circuits generally also include active optical integrated devices such as lasers, optical amplifiers, modulators and the like.

In some embodiments the input and output platforms shown in FIGS. 1A and 1B may be monolithically integrated with one another. In other embodiments, however, the input and output platforms may be stacked on top of one another hybridly attached using any suitable technique.

Figure 4:
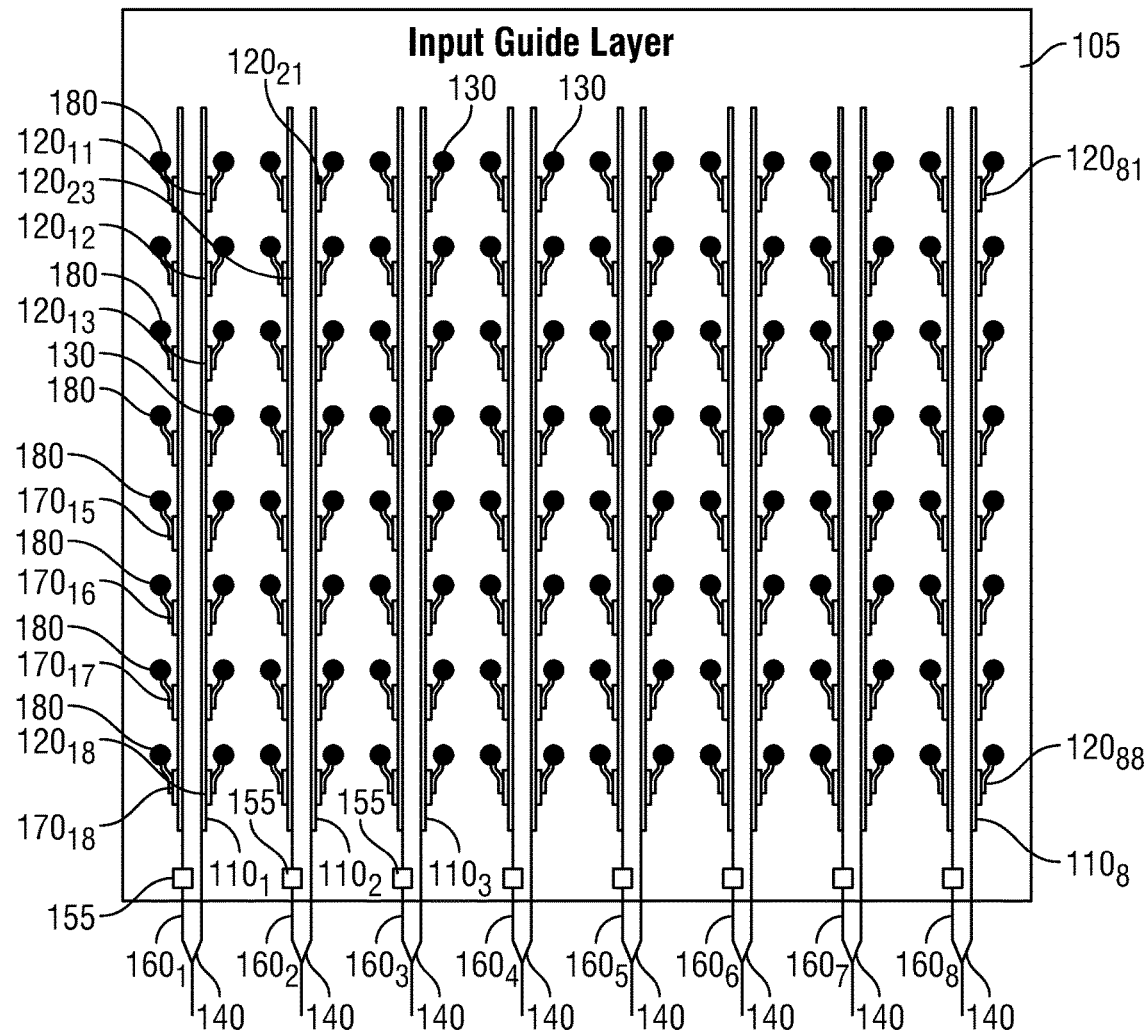
FIG. 4 shows an input platform for an M×M optical switch that supports polarization diversity.

In some embodiments the input and output waveguides in the input and output platforms may only support a single polarization state. In these embodiments polarization diversity may be achieved by providing a pair of waveguides for each input and output waveguide, with each waveguide in the pair supporting a different polarization state. This is shown in FIG. 4 for the input platform of FIG. 1A. As shown, each input now includes a pair of waveguides 110 and 160. The input to each pair of waveguides 110 and 160 includes a polarization splitter 140 that splits the incoming light so that a single polarization state is transmitted through each of the waveguides 110 and 160. A polarization rotator 155 rotates the polarization state of the light in waveguides 160 so that it has the same polarization state as the light in waveguides 110. As in FIG. 1A, waveguides 110 have a series of 1×2 optical switches 120 located along it and each of the 1×2 optical switches 120 is associated with a vertical coupler 130. Likewise, waveguides 160 have a series of 1×2 optical switches 170 located along it and each of the 1×2 optical switches 170 is associated with a vertical coupler 180. The output platform may be configured in a manner similar to that shown in FIG. 4 for the input platform to achieve polarization diversity.

Numerous advantages arise from the use of a switching architecture of the type described above. For example, because in the aforementioned embodiments there are no intervening mode perturbing structures (e.g., optical elements such as gratings or taps, waveguide crossings, material or dopant changes, metallization structures, waveguide dimensional changes, refractive index profile changes) located along any of the input or output waveguides between adjacent 1×2 switches, waveguide losses at an given wavelength only depend on or scale with the length of the waveguides between adjacent 1×2 switches. Likewise, optical losses in a switch conforming to this architecture do not scale with the number of input or output ports, but only with the overall physical dimensions of the switch as determined by the total length of the waveguides.

Thus, by way of example, optical losses arising in currently available low loss air clad waveguides may range from about 0.5 dB/cm to 2 dB/cm. Accordingly, for an optical switch employing such waveguides and having 96 input ports and 96 output ports, and assuming each waveguide is 5 mm in length, the optical losses arising in the waveguides will be up to about 0.5 dB. Likewise, for an optical switch having 1000 input ports and 1000 output ports, and assuming each waveguide is 50 mm in length, the optical losses arising in the waveguides will be up to about 5 dB.

It should be noted that in some embodiments there may be intervening structures located along one or more of the input and/or output waveguides, provided that the intervening structure or structures are actuatable into a state that does not perturb the mode of the light traveling in the waveguide along which the intervening structure is located. Any such intervening structure should give rise to optical losses in the non-perturbing state that are no greater than that caused by the 1×2 optical switches. For instance, if the 1×2 optical switches have a loss in the through-state of about 0.001 dB, then any intervening structures should also have loss in their non-perturbing state that is no greater than, and preferably less than, 0.001 dB.

In yet other embodiments one or more additional 1×2 optical switches of the types mentioned above may be located along one or more of the input and/or output waveguides. These switches may be used for purposes other than switching light from an input port to an output port. For example, these additional 1×2 switches may direct light to an optical detector (e.g., a photodiode) when in their cross states, thereby performing an optical monitoring function. In one particular embodiment such a 1×2 optical switch and optical detector pair may be located along the input and/or output waveguides between each pair of adjacent 1×2 optical switches that are used to switch light from the input to the output waveguides. In this way optical monitoring can be performed at any point along the waveguides after the light passes traverses any one of the 1×2 optical switches when in the through state.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An optical switching arrangement, comprising:
a plurality of input waveguides, each of the input waveguides having a first plurality of 1×2 optical switches associated therewith and extending therealong;
a plurality of output waveguides, each of the output waveguides having a second plurality of 1×2 optical switches associated therewith and extending therealong;
each of the optical switches in the first and second plurality of optical switches being selectively switchable between first and second states such that in a first state each optical switch allows light propagating in the input or output waveguide with which it is associated to continue propagating therethrough undisturbed without encountering any intervening mode perturbing structures between adjacent ones of the 1×2 switches and in a second state each optical switch couples light into or out of the input or output waveguide with which it is associated; and
wherein each of the first plurality of optical switches associated with each of the input waveguides is optically coupled to one of the second plurality of optical switches in a different one of the output waveguides when both optical switches are in the second state.

2. The optical switching arrangement of claim 1 wherein each of the 1×2 switches comprises:
a displaceable optical cross-guide, the 1×2 switch being in the first state when the optical cross-guide is a first distance from the input or output waveguide with which each of the 1×2 switches is respectively associated and in a second state when the optical cross-guide is a second distance from the input or output waveguide with which each of the 1×2 switches is respectively associated;
an actuator for selectively displacing the displaceable optical cross-guide so that its distance from the input or output waveguide with which it is associated is equal to the first or second distance.

3. The optical switching arrangement of claim 2 wherein the actuator is a MEMs-based actuator.

4. The optical switching arrangement of claim 2 wherein the actuator is a digital, two-state actuator.

5. The optical switching arrangement of claim 2 wherein the actuator is latching in the first state.

6. The optical switching arrangement of claim 1 further comprising a plurality of optical coupling elements each optically coupling one of the first plurality of optical switches associated with each of the input waveguides to one of the second plurality of optical switches associated with one of the output waveguides when both optical switches are in the second state.

7. The optical switching arrangement of claim 1 further comprising a first planar lightwave or photonic integrated circuit in which the plurality of input waveguides and the first plurality of 1×2 optical switches are integrated.

8. The optical switching arrangement of claim 7 further comprising a second planar lightwave or photonic integrated circuit in which the plurality of output waveguides and the second plurality of 1×2 optical switches are integrated.

9. The optical switching arrangement of claim 8 wherein the first and second planar lightwave or photonic integrated circuits are stacked on top of one another.

10. The optical switching arrangement of claim 9 wherein the first and second planar lightwave or photonic integrated circuits are hybridly attached to one another.

11. The optical switching arrangement of claim 9 wherein the first and second lightwave or photonic integrated circuits are monolithically integrated with one another.

12. The optical switching arrangement of claim 9 further comprising a plurality of vertical couplers each optically coupling one of the first plurality of optical switches associated with each of the input waveguides to one of the second plurality of optical switches associated with one of the output waveguides when both optical switches are in the second state.

13. The optical switching arrangement of claim 1 wherein each of the 1×2 optical switches in the first and second pluralities of 1×2 optical switches exhibit lower loss in the first state than in the second state.

14. The optical switching arrangement of claim 1 further comprising a controller for selectively switching light from any one of the input waveguides to any one of the output waveguides by causing one of the first plurality of optical switches and one of the second plurality of optical switches to be placed in the second state and causing all remaining optical switches in the first and second pluralities of optical switches to be placed in the first state.

15. The optical switching arrangement of claim 1 further comprising a controller for (i) selectively switching light from a first selected one of the input waveguides to a first selected one of the output waveguides by causing one of the first plurality of optical switches and one of the second plurality of optical switches to be placed in the second state and (ii) simultaneously switching light from a second selected one of the input waveguides to a second selected one of the output waveguides by causing another of the first plurality of optical switches and another of the second plurality of optical switches to be placed in the second state while (iii) causing all remaining optical switches in the first and second pluralities of optical switches to be placed in the first state.

16. The optical switching arrangement of claim 1 wherein the input and output waveguides are air clad waveguides.

17. The optical switching arrangement of claim 1 wherein the input and output waveguides are single mode waveguides.

18. The optical switching arrangement of claim 1 wherein the plurality of input and output waveguides support light traveling in a single polarization state.

19. The optical switching arrangement of claim 18 further comprising:
 a second plurality of input waveguides, each of the input waveguides in the second plurality having a third plurality of 1×2 optical switches associated therewith and extending therealong;
 a second plurality of output waveguides, each of the output waveguides in the second plurality having a fourth plurality of 1×2 optical switches associated therewith and extending therealong;
 each of the optical switches in the third and fourth plurality of optical switches being selectively switchable between first and second states such that in a first state each optical switch allows light propagating in the input or output waveguide with which it is associated to continue propagating therethrough undisturbed without encountering any intervening mode perturbing structures between adjacent ones of the 1×2 switches and in a second state of the optical switches couples light into or out of the input or output waveguide with which it is associated;
 wherein each of the third plurality of optical switches associated with each of the input waveguides in the second plurality is optically coupled to one of the fourth plurality of optical switches in a different one of the output waveguides in the second plurality when both optical switches in the third and fourth pluralities are in the second state; and
 a plurality of polarization splitters each coupling an input port of one of the plurality of input waveguides to an input port of one of the second plurality of input waveguides.

20. The optical switching arrangement of claim 19 further comprising a polarization rotator for rotating the polarization of light in the second plurality of input waveguides into a common polarization state with light in the plurality of input waveguides.

21. The optical switching arrangement of claim 19 further comprising a first planar lightwave circuit in which are integrated the plurality of input waveguides, the first plurality of 1×2 optical switches, the second plurality of input waveguides and the third plurality of 1×2 optical switches.

22. The optical switching arrangement of claim 21 wherein the plurality of input waveguides and the second plurality of input waveguides are parallel to one another.

23. The optical switching arrangement of claim 22 wherein the input waveguides in each pair of input waveguides that are coupled by one of the polarization splitters are adjacent to one another.

24. The optical switching arrangement of claim 1 further comprising:
 a photodetector;
 at least one additional 1×2 optical switch being associated with and extending along at least one of the input waveguides and/or the output waveguides such that light is coupled from the at least one input and/or output waveguide to the photodetector when the additional 1×2 switch is in the second state.

25. An optical switching arrangement, comprising:
 a plurality of input waveguides, each of the input waveguides having a first plurality of 1×2 optical switches associated therewith and extending therealong;
 a plurality of output waveguides, each of the output waveguides having a second plurality of 1×2 optical switches associated therewith and extending therealong, each of the first and second plurality of optical switches being selectively switchable between a through-state and a cross-state, the input and output waveguides being arranged such that light propagating in any and all of the input and output waveguides does not traverse a waveguide crossing;
 wherein each of the first plurality of optical switches associated with each of the input waveguides is optically coupled to one of the second plurality of optical switches in a different one of the output waveguides when both optical switches are in the cross-state.

26. An optical switching arrangement, comprising:
 a plurality of input waveguides, each of the input waveguides having a first plurality of 1×2 optical switches associated therewith and extending therealong;
 a plurality of output waveguides, each of the output waveguides having a second plurality of 1×2 optical switches associated therewith and extending therealong, each of the first and second plurality of optical switches being selectively switchable between a through-state and a cross-state, the input and output waveguides being arranged such that optical losses arising for any wavelength of light only depend on a length of segments of the input and output waveguides located between adjacent ones of the 1×2 optical switches;
 wherein each of the first plurality of optical switches associated with each of the input waveguides is optically coupled to one of the second plurality of optical switches in a different one of the output waveguides when both optical switches are in the cross-state.

27. An optical switching arrangement, comprising:
 a plurality of input waveguides, each of the input waveguides having a first plurality of 1×2 optical switches associated therewith and extending therealong;
 a plurality of output waveguides, each of the output waveguides having a second plurality of 1×2 optical switches associated therewith and extending therealong;
 each of the optical switches in the first and second plurality of optical switches being selectively switchable between first and second states such that in a first state each optical switch allows light propagating in the input or output waveguide with which it is associated to continue propagating therethrough and in a second state each optical switch couples light into or out of the input or output waveguide with which it is associated, the input and output waveguides being arranged such that optical losses arising for any wavelength of light only depend on a length of segments of the input and output waveguides located between adjacent ones of the 1×2 optical switches; and wherein each of the first plurality of optical switches associated with each of the input waveguides is optically coupled to one of the second plurality of optical switches in a different one of the output waveguides when both optical switches are in the second state, each of the 1×2 switches including (i) a displaceable optical cross-guide, the 1×2 switch being in the first state when the optical cross-guide is a first distance from the input or output waveguide with which each of the 1×2 switches is respectively associated and in a second state when the optical cross-guide is a second distance from the input or output waveguide with which each of the 1×2 switches is respectively associated and (ii) an actuator for selectively displacing the displaceable optical cross-guide so that its distance from the input or output waveguide with which it is associated is equal to the first or second distance.

28. The optical switching arrangement of claim 26 wherein each of the 1×2 switches comprises:
a displaceable optical cross-guide, the 1×2 switch being in the through state when the optical cross-guide is a first distance from the input or output waveguide with which each of the 1×2 switches is respectively associated and in the cross-state when the optical cross-guide is a second distance from the input or output waveguide with which each of the 1×2 switches is respectively associated;
an actuator for selectively displacing the displaceable optical cross-guide so that its distance from the input or output waveguide with which it is associated is equal to the first or second distance.

29. The optical switching arrangement of claim 28 wherein the actuator is a MEMs-based actuator.

30. The optical switching arrangement of claim 28 wherein the actuator is a digital, two-state actuator.

31. The optical switching arrangement of claim 28 wherein the actuator is latching in the through-state.

32. The optical switching arrangement of claim 26 further comprising a plurality of optical coupling elements each optically coupling one of the first plurality of optical switches associated with each of the input waveguides to one of the second plurality of optical switches associated with one of the output waveguides when both optical switches are in the cross-state.

33. The optical switching arrangement of claim 26 further comprising a first planar lightwave or photonic integrated circuit in which the plurality of input waveguides and the first plurality of 1×2 optical switches are integrated.

34. The optical switching arrangement of claim 33 further comprising a second planar lightwave or photonic integrated circuit in which the plurality of output waveguides and the second plurality of 1×2 optical switches are integrated.

35. The optical switching arrangement of claim 34 wherein the first and second planar lightwave or photonic integrated circuits are stacked on top of one another.

36. The optical switching arrangement of claim 35 wherein the first and second planar lightwave or photonic integrated circuits are hybridly attached to one another.

37. The optical switching arrangement of claim 35 wherein the first and second lightwave or photonic integrated circuits are monolithically integrated with one another.

38. The optical switching arrangement of claim 35 further comprising a plurality of vertical couplers each optically coupling one of the first plurality of optical switches associated with each of the input waveguides to one of the second plurality of optical switches associated with one of the output waveguides when both optical switches are in the cross-state.

39. The optical switching arrangement of claim 26 wherein each of the 1×2 optical switches in the first and second pluralities of 1×2 optical switches exhibit lower loss in the through-state than in the cross-state.

40. The optical switching arrangement of claim 26 further comprising a controller for selectively switching light from any one of the input waveguides to any one of the output waveguides by causing one of the first plurality of optical switches and one of the second plurality of optical switches to be placed in the cross-state and causing all remaining optical switches in the first and second pluralities of optical switches to be placed in the through-state.

41. The optical switching arrangement of claim 26 further comprising a controller for (i) selectively switching light from a first selected one of the input waveguides to a first selected one of the output waveguides by causing one of the first plurality of optical switches and one of the second plurality of optical switches to be placed in the cross-state and (ii) simultaneously switching light from a second selected one of the input waveguides to a second selected one of the output waveguides by causing another of the first plurality of optical switches and another of the second plurality of optical switches to be placed in the cross-state while (iii) causing all remaining optical switches in the first and second pluralities of optical switches to be placed in the through-state.

42. The optical switching arrangement of claim 26 wherein the input and output waveguides are air clad waveguides.

43. The optical switching arrangement of claim 26 wherein the input and output waveguides are single mode waveguides.

44. The optical switching arrangement of claim 26 wherein the plurality of input and output waveguides support light traveling in a single polarization state.

45. The optical switching arrangement of claim 44 further comprising:
a second plurality of input waveguides, each of the input waveguides in the second plurality having a third plurality of 1×2 optical switches associated therewith and extending therealong;
a second plurality of output waveguides, each of the output waveguides in the second plurality having a fourth plurality of 1×2 optical switches associated therewith and extending therealong;
each of the optical switches in the third and fourth plurality of optical switches being selectively switchable between through and cross-states such that in a through state each optical switch allows light propagating in the input or output waveguide with which it is associated to continue propagating therethrough undisturbed without encountering any intervening mode perturbing structures between adjacent ones of the 1×2 switches and in a cross-state of the optical switches couples light into or out of the input or output waveguide with which it is associated;

wherein each of the third plurality of optical switches associated with each of the input waveguides in the second plurality is optically coupled to one of the fourth plurality of optical switches in a different one of the output waveguides in the second plurality when both optical switches in the third and fourth pluralities are in the cross-state; and a plurality of polarization splitters each coupling an input port of one of the plurality of input waveguides to an input port of one of the second plurality of input waveguides.

46. The optical switching arrangement of claim 45 further comprising a polarization rotator for rotating the polarization of light in the second plurality of input waveguides into a common polarization state with light in the plurality of input waveguides.

47. The optical switching arrangement of claim 45 further comprising a first planar lightwave circuit in which are integrated the plurality of input waveguides, the first plurality of 1×2 optical switches, the second plurality of input waveguides and the third plurality of 1×2 optical switches.

48. The optical switching arrangement of claim 47 wherein the plurality of input waveguides and the second plurality of input waveguides are parallel to one another.

49. The optical switching arrangement of claim 48 wherein the input waveguides in each pair of input waveguides that are coupled by one of the polarization splitters are adjacent to one another.

50. The optical switching arrangement of claim 26 further comprising:
   a photodetector;
   at least one additional 1×2 optical switch being associated with and extending along at least one of the input waveguides and/or the output waveguides such that light is coupled from the at least one input and/or output waveguide to the photodetector when the additional 1×2 switch is in the cross-state.

* * * * *